United States Patent
Neumann et al.

(10) Patent No.: US 10,551,621 B2
(45) Date of Patent: Feb. 4, 2020

(54) LIGHT-TRANSMITTING PANE FOR DISPLAYING AN IMAGE OF A HEAD-UP DISPLAY FOR POLARIZED SUNGLASSES

(71) Applicant: Bayerische Motoren Werke Aktiengesellschaft, Munich (DE)

(72) Inventors: Alexander Neumann, Munich (DE); Louis Costa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 14/250,719

(22) Filed: Apr. 11, 2014

(65) Prior Publication Data
US 2014/0307176 A1   Oct. 16, 2014

(30) Foreign Application Priority Data
Apr. 12, 2013   (DE) .......................... 10 2013 206 505

(51) Int. Cl.
*G02B 27/01* (2006.01)
*G02F 1/00* (2006.01)

(52) U.S. Cl.
CPC ........ *G02B 27/0149* (2013.01); *G02F 1/0045* (2013.01)

(58) Field of Classification Search
USPC .......................................................... 349/9
See application file for complete search history.

(56) References Cited

U.S. PATENT DOCUMENTS

| | | | |
|---|---|---|---|
| 3,679,290 A | 7/1972 | Adams et al. | |
| 4,900,133 A | 2/1990 | Berman | |
| 4,961,625 A * | 10/1990 | Wood et al. | 359/630 |
| 5,164,853 A * | 11/1992 | Shimazaki | 349/73 |
| 5,999,314 A * | 12/1999 | Asakura | B32B 17/10036 345/7 |
| 6,580,482 B1 * | 6/2003 | Hiji et al. | 349/115 |
| 7,203,005 B2 | 4/2007 | Jiang et al. | |
| 2003/0090618 A1 * | 5/2003 | Kashima | G02B 5/3016 349/194 |
| 2004/0135742 A1 * | 7/2004 | Weber | G02B 5/305 345/7 |
| 2005/0286022 A1 * | 12/2005 | Park | H04N 9/315 353/20 |
| 2009/0009710 A1 * | 1/2009 | Nirmal et al. | 349/176 |
| 2010/0134724 A1 * | 6/2010 | Arakawa | G02B 5/3016 349/96 |

OTHER PUBLICATIONS

German Search Report dated Jan. 16, 2014 with English translation (eleven (11) pages).

* cited by examiner

*Primary Examiner* — Edward J Glick
*Assistant Examiner* — David Y Chung
(74) *Attorney, Agent, or Firm* — Crowell & Moring LLP

(57) ABSTRACT

A light-transmitting pane for displaying an image of a head-up display is provided. The light-transmitting pane includes a cholesteric liquid-crystal layer arrangement, which is arranged in the interior of the pane or is arranged on a surface of the pane. Depending on the polarization of the incident light, at least a portion of the light generated by an image generating device of a head-up display arrangement can be reflected on the cholesteric liquid-crystal layer arrangement such that the reflected light has a p-polarized fraction, which can be perceived through polarized sunglasses.

9 Claims, 5 Drawing Sheets

10,551,621 B2

LIGHT-TRANSMITTING PANE FOR DISPLAYING AN IMAGE OF A HEAD-UP DISPLAY FOR POLARIZED SUNGLASSES

CROSS REFERENCE TO RELATED APPLICATIONS

This application claims priority under 35 U.S.C. § 119 from German Patent Application No. 10 2013 206 505.1, filed Apr. 12, 2013, the entire disclosure of which is herein expressly incorporated by reference.

BACKGROUND AND SUMMARY OF THE INVENTION

The invention relates to a light-transmitting pane for displaying an image of a head-up display for polarized sunglasses. The invention further relates to a head-up display arrangement and to a vehicle having such a head-up display arrangement.

Head-up display arrangements can be used in vehicles for displaying information. A head-up display arrangement includes an image generating device for generating a virtual image and a light-transmitting pane for displaying the image. The head-up display arrangement thereby makes it possible to display information for a driver directly on the windshield of a vehicle. For this purpose, the image generating device generates rays of light in the direction of the windshield, which rays of light are reflected on the windshield in the direction of the driver. In this case, s-polarized light exhibits particularly good reflection properties. In the case of s-polarized light, the image generating device generates the light in an almost perpendicularly polarized manner with the respect to the plane of incidence on the windshield.

It is disadvantageous that the s-polarized light reflected at the windshield can only be perceived to a very limited extent or not at all by way of sunglasses which have a polarization filter. The lenses of these so-called polarized sunglasses are generally light-transmitting for p-polarized light, i.e. light that is polarized in a parallel manner with respect to the plane of incidence of the windshield.

In order to be able to read a full-color image from a head-up display arrangement by way of polarized sunglasses, additional measures are required with respect to the light-transmitting pane, particularly the windshield or combiner pane, of the head-up display arrangement. Although solutions exist for monochrome head-up displays, these cannot be used for full-color displays.

It is desirable to indicate a light-transmitting pane for a head-up display arrangement, on which the light generated by an image generating device of the head-up display arrangement is reflected and can be clearly seen by way of polarized sunglasses. Beyond that, it is desirable to indicate a head-up display arrangement which makes it possible to reflect the light generated by an image generating device of the head-up display arrangement on a light-transmitting pane and to clearly see it by way of polarized sunglasses. Furthermore, a vehicle is to be indicated that has such a head-up display arrangement.

According to a conceivable embodiment, a light-transmitting pane for a head-up display arrangement for displaying an image visible by way of polarized sunglasses includes a cholesteric liquid-crystal layer arrangement which is arranged in the interior of the pane or is arranged on a surface of the pane. An embodiment of a head-up display arrangement includes a light-transmitting pane of the above-mentioned type as well as an image generating device for generating an image by way of rays of light generated on the output side. The pane and the image generating device are arranged such that the light generated by the image generating device impinges on the cholesteric liquid-crystal layer arrangement.

The cholesteric liquid-crystal layer arrangement can be applied directly to the glass, which can be used as the substrate in this embodiment. According to a further embodiment, the cholesteric liquid-crystal layer arrangement can be applied to a polymer film substrate and be glued onto a surface of the light-transmitting pane or be integrated in the interior of the pane. When the pane is a windshield or a combiner pane of a vehicle, onto which the cholesteric liquid-crystal layer arrangement is glued, light generated by the image generating device on the output side in a circular or p-polarized manner, when impinging on the cholesteric liquid-crystal layer arrangement, is reflected in a circularly polarized manner in the direction of the driver. The p-polarized light fraction of the circularly polarized light is transmitted by polarized sunglasses and, for the wearer of the sunglasses, results in a visible image generated by the head-up display. When the cholesteric liquid-crystal layer arrangement is arranged in the interior of the pane, although the p-polarized light fraction directed to the driver is changed because of the air-glass boundary layer of the pane, so that elliptically polarized light is reflected in the driver's direction, depending on the selected polarization of the impinging light, the p-polarized light fraction of the reflected light will still always be sufficiently large in order to be perceived by a wearer of the polarized sunglasses.

In the following, the invention will be explained in detail by means of figures, the embodiments of the light-transmitting pane, the head-up display arrangement and the vehicle having such a head-up display arrangement.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
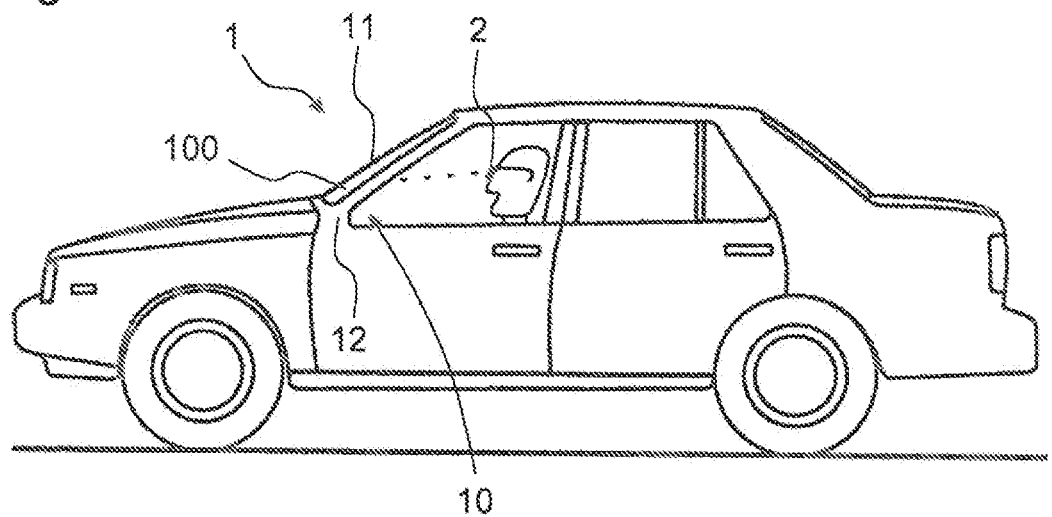
FIG. 1 is a view of an embodiment of a vehicle having a head-up display arrangement.

FIG. 1 illustrates a vehicle 1 having a head-up display arrangement 10. The head-up display arrangement 10 includes a light-transmitting pane 11 and an image generating device 12 for generating an image. The light-transmitting pane 11 may be designed as a windshield of a vehicle or as a combiner pane of the head-up display arrangement 10. The image generating device 12 generates light on the output side in the direction of the light-transmitting pane 11. Since the lenses of polarized sunglasses 2 are sufficiently transparent only for light that is p-polarized with respect to the plane of incidence of the pane 11, i.e. parallel-polarized, the image generating device 12 generates the light in such a manner that the light exiting on the output side from the image generating device has at least a p-polarized fraction. A p-polarized portion of the reflected light can be perceived by the wearer of the polarized sunglasses.

The image generating device 12 can generate, for example, circularly polarized light, i.e. light that is 50% s-polarized and 50% p-polarized with respect to the plane of incidence of the pane 11. According to a further embodiment of the head-up display arrangement 10, the image generating device 12 generates light that is 100% p-polarized with respect to the plane of incidence of the pane 11.

The p-polarized fraction of light is almost completely transmitted by a light-transmitting pane, for example, a glass pane or a pane made of a material of transparent plastic. So that at least a portion of the p-polarized fraction of the light generated by the image generating device 12 can be reflected in the direction of the driver, a layer arrangement 100 of cholesteric liquid-crystals is used as a reflecting layer in or on the light-transmitting pane 11 of the head-up display arrangement. The cholesteric liquid-crystal layer arrangement 100 is designed for reflecting at least a portion of the light impinging on the cholesteric liquid-crystal layer arrangement 100, particularly a portion of the p-polarized light.

When the cholesteric liquid-crystal layer arrangement 100 is applied to a surface of the light-transmitting pane, light impinging circularly or in a p-polarized manner on the pane is reflected in a circularly polarized manner. This means that a light intensity ratio of s- to p-polarized light of 1:1 is present in the reflected light. The p-polarized light fraction is transmitted by the lenses of the polarized sunglasses and results in a visible image generated by the head-up display arrangement. As a result, the image of a full-color head-up display becomes visible within an acceptable scope also by way of polarized sunglasses.

Figure 2:
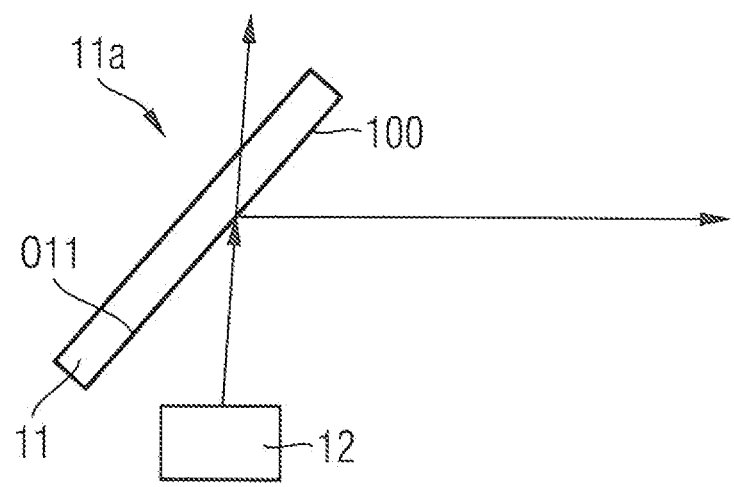
FIG. 2 is a view of a first embodiment of a light-transmitting pane for displaying an image of a head-up display.

FIG. 2 illustrates an embodiment 11a of the light-transmitting pane 11 with a cholesteric liquid-crystal layer arrangement 100 arranged on a surface 011 of the pane. The image generating device 12 can generate the light in the direction of the cholesteric liquid-crystal layer arrangement 100 of the pane 11 in a circularly polarized manner, i.e. 50% s-polarized and 50% p-polarized with respect to the plane of incidence. According to a further embodiment, the image generating device 12 can generate the light in the direction of the cholesteric liquid-crystal layer arrangement 100 in a completely p-polarized manner. The cholesteric liquid-crystal layer arrangement 100 reflects the circularly or p-polarized light impinging on it so that, in both cases, circularly polarized light, i.e. light that is 50% s-polarized and 50% p-polarized, is reflected in the direction of the driver. The fraction of the light that is transmitted by the cholesteric liquid-crystal layer arrangement 100, for p-polarized light impinging on the pane, is polarized almost completely parallel to the plane of incidence of the pane.

Figure 3:
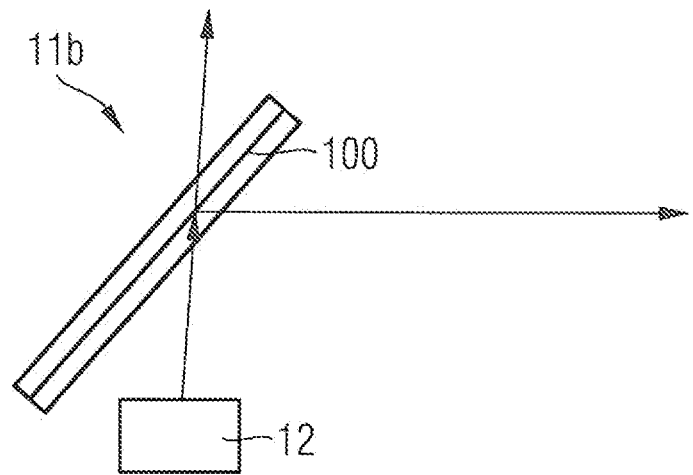
FIG. 3 is a view of a second embodiment of a light-transmitting pane for displaying an image of a head-up display.

FIG. 3 illustrates an embodiment 11b of the light-transmitting pane 11, in the case of which, in contrast to the embodiment 11a illustrated in FIG. 2, the cholesteric liquid-crystal layer arrangement 100 is arranged in the interior of the pane 11. As in the embodiment of FIG. 2, the lighting device 12 of the head-up display arrangement 10 can generate circularly or p-polarized light. As in the embodiment of FIG. 2, the pane 11 and the lighting device 12 are oriented with respect to one another such that the light impinges on the cholerestic liquid-crystal layer arrangement 100 arranged in the interior of the pane 11. In contrast to the embodiment of FIG. 2, in the embodiment of FIG. 3, because of the air-glass boundary layer, the p-polarized light fraction directed to the driver is changed, so that the light reflected in the direction of the driver is elliptically polarized. Nevertheless, the p-polarized fraction of the reflected elliptically polarized light is sufficiently large in order to be able to be perceived by polarized sunglasses.

The reflectivity at the pane 11 for p-polarized light, particularly the reflectivity at the air/glass boundary layer, when the light enters into the pane, and at the glass/air boundary layer, when the light exits the pane, for the relevant area of the angle of incidence, between 60° and 65° is relatively low. This has the advantage that, when p-polarized light is used, double images occur as a result of reflection at the pane only to a limited degree, so that so-called ghosting effects can be minimized.

The cholerestic liquid-crystal layer systems can be applied to a substrate, for example, to a polymer film substrate. This permits the functionalization of a combiner of a head-up display or a windshield which is used as a projection surface of a mirror head-up display. In the embodiment illustrated in FIG. 2, the substrate may, for example, be constructed as a self-adhesive polymer foil to which the cholesteric liquid-crystal layer arrangement is applied. The self-adhesive polymer foil with the cholerestic liquid-crystal layer arrangement can be applied to the surface 011 of the light-transmitting pane. The embodiment illustrated in FIG. 2 therefore makes it possible to apply the cholesteric liquid-crystal layer arrangement to the pane 11 only subsequently. For producing the embodiment illustrated in FIG. 3, the substrate constructed as a polymer foil with the cholesteric liquid-crystal layer system can be embedded in the pane 11 by a laminating process.

Figure 4:
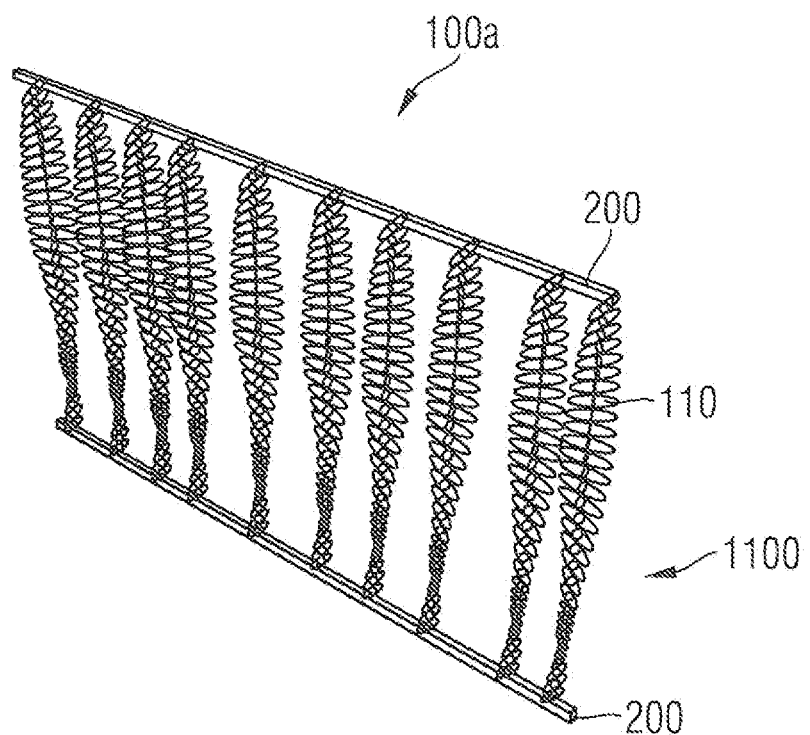
FIG. 4 is a view of a first embodiment of a cholesteric liquid-crystal layer arrangement for a light-transmitting pane of a head-up display arrangement.

FIG. 4 illustrates an embodiment of a cholesteric liquid-crystal layer arrangement 100a which can be applied to the surface 011 of the light-transmitting pane 11a illustrated in FIG. 2 or can be integrated in the light-transmitting pane 11b illustrated in FIG. 3. The cholesteric liquid-crystal layer arrangement 100a is arranged on a substrate 200, for example, a polymer layer. In one layer plane S1, the cholesteric liquid-crystal layer arrangement 100a contains at least one helical molecule arrangement of a certain pitch. Preferably, a plurality of helical molecule arrangements 110 are present within the layer plane S1. The individual molecules 110 of each of the helical molecule arrangements 1100 are wound spirally around an axis which is orthogonally aligned with respect to the substrate 200. Each of the molecule arrangements 1100 has a well-defined chirality within a period of its pitch. For example, each of the molecule arrangements 1100 may have a right-handed winding of its molecules 110 within a period of its pitch. The reflection behavior of the cholesteric liquid-crystal layer arrangement can be set by the respective pitch and the respective overall height of the helical molecule arrangements.

Figure 5:
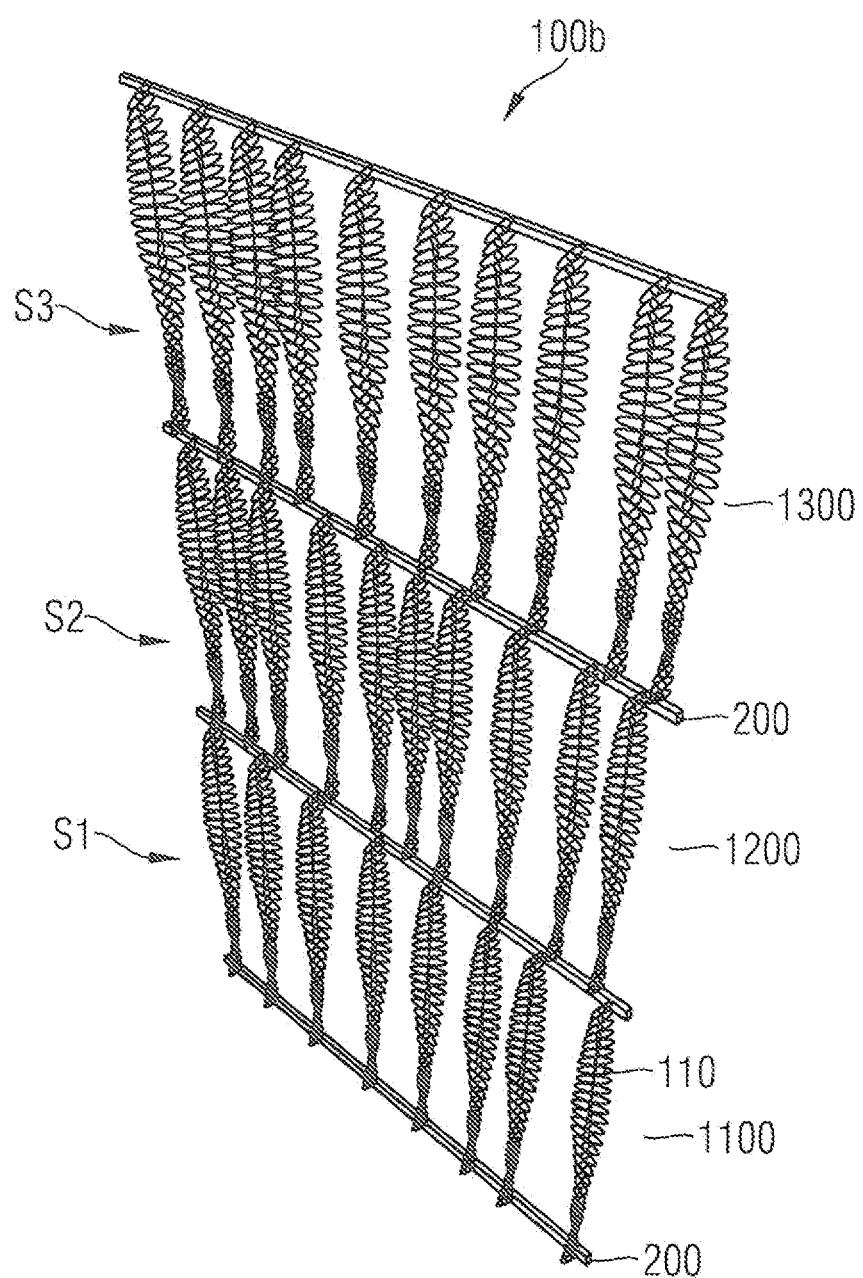
FIG. 5 is a view of a second embodiment of a cholesteric liquid-crystal layer arrangement for a light-transmitting pane of a head-up display arrangement.

FIG. 5 illustrates an embodiment of a cholesteric liquid-crystal layer arrangement 100b for a light-transmitting pane of a head-up display arrangement. The cholesteric liquid-crystal layer arrangement 100b can be applied to the surface 011 of the light-transmitting pane 11a illustrated in FIG. 2 or can be integrated in the light-transmitting pane 11b illustrated in FIG. 3. In different layer planes S1, S2 and S3 arranged above one another, the cholesteric liquid-crystal layer arrangement 100b has at least one helical molecule arrangement 1100, 1200 and 1300 respectively. Preferably, a plurality of helical molecule arrangements 1100, 1200 and 1300 are arranged in each of the layer planes S1, S2 and S3. The respective helical molecule arrangements 1100, 1200 and 1300 have a different pitch and/or a different overall length in the different layer planes S1, S2 and S3. In contrast, the helical molecule arrangements 1100, 1200 and 1300 present in a layer have a uniform pitch and/or a uniform overall length.

For example, the helical molecule arrangements 1100 in the layer plane S1 have a pitch of 300 nm; the helical molecule arrangements 1200 in the layer plane S2 have a pitch of 370 nm; and the helical molecule arrangements 1300 in the layer plane S3 have a pitch of 460 nm. The helix length of the molecule arrangements 1100 may, for example, amount to 750 nm in the layer plane S1. The helix length of the molecule arrangements 1200 may, for example, amount to 925 nm in the layer plane S2; and the helix length of the molecule arrangements 1300 may, for example, amount to 1,150 nm in the layer plane S3.

The helical molecule arrangements of the different layers S1, S2, S3 per layer are each arranged on a substrate 200, for example, a polymer layer. The individual molecules 110 of each of the helical molecule arrangements 1100, 1200, 1300 are wound spirally around an axis which is orthogonally aligned with respect to the respective substrate 200. Each of the molecule arrangements 1100, 1200 and 1300 has a well-defined chirality within a period of its pitch.

In the embodiment of FIG. 5, the respective helical molecule arrangements of the different layer planes S1, S2 and S3 have the same chirality. For example, each of the molecule arrangements 1100, 1200 and 1300 may have a right-handed winding of its molecules 110 within a period of its pitch. The reflection behavior of the cholesteric liquid-crystal layer arrangement 100b can be set by the respective pitch and the respective overall height of the helical molecule arrangements 1100, 1200 and 1300.

According to a conceivable embodiment, the cholesteric liquid-crystal layer arrangements 100a, 100b and 100c have a double-refracting construction. The layer arrangement has an ordinary and extraordinary index of refraction. The ordinary index of refraction may of a value of approximately 1.5. The extraordinary index of refraction may assume a very low double refraction value of, for example, of 1.5, but also a value of up to 1.8.

By way of such a cholesteric liquid-crystal layer arrangement, for p-polarized light impinging on a pane 11 made of glass, for example, a reflectivity of approximately 20% to 25% can be achieved in the optical wavelength range for an oblique angle of incidence of 65°. The light reflected in the direction of the driver from the layer system 100b is circularly polarized. The light transmitted by the layer system 100b is polarized almost completely parallel with respect to the plane of incidence, resulting in advantages for the double image suppression. The transmitting capability for non-polarized light amounts to approximately 80%.

The cholesteric liquid-crystal layer arrangement may be constructed such that a reflection edge for light with an angle of incidence of 0° is at approximately 400 nm, which corresponds to the beginning of the perceptible visible wavelength spectrum. In the case of a variation of the angle of incidence, color distortions can thereby be avoided. At almost all angles of incidence, the visible wavelength range has an approximately constant degree of reflection/transmission.

When light is used that impinges on the layer arrangement 100b in a right-circular manner, the chirality of the light is adapted to the chirality of the molecule arrangement, which results in an increase of the reflection efficiency by approximately 40%. However, in this case, double-image effects (ghosting effects) become superproportionally more light-intensive. For reducing the double-image effects, an antireflection coating can be applied to the light-transmitting pane 11.

Figure 6A:
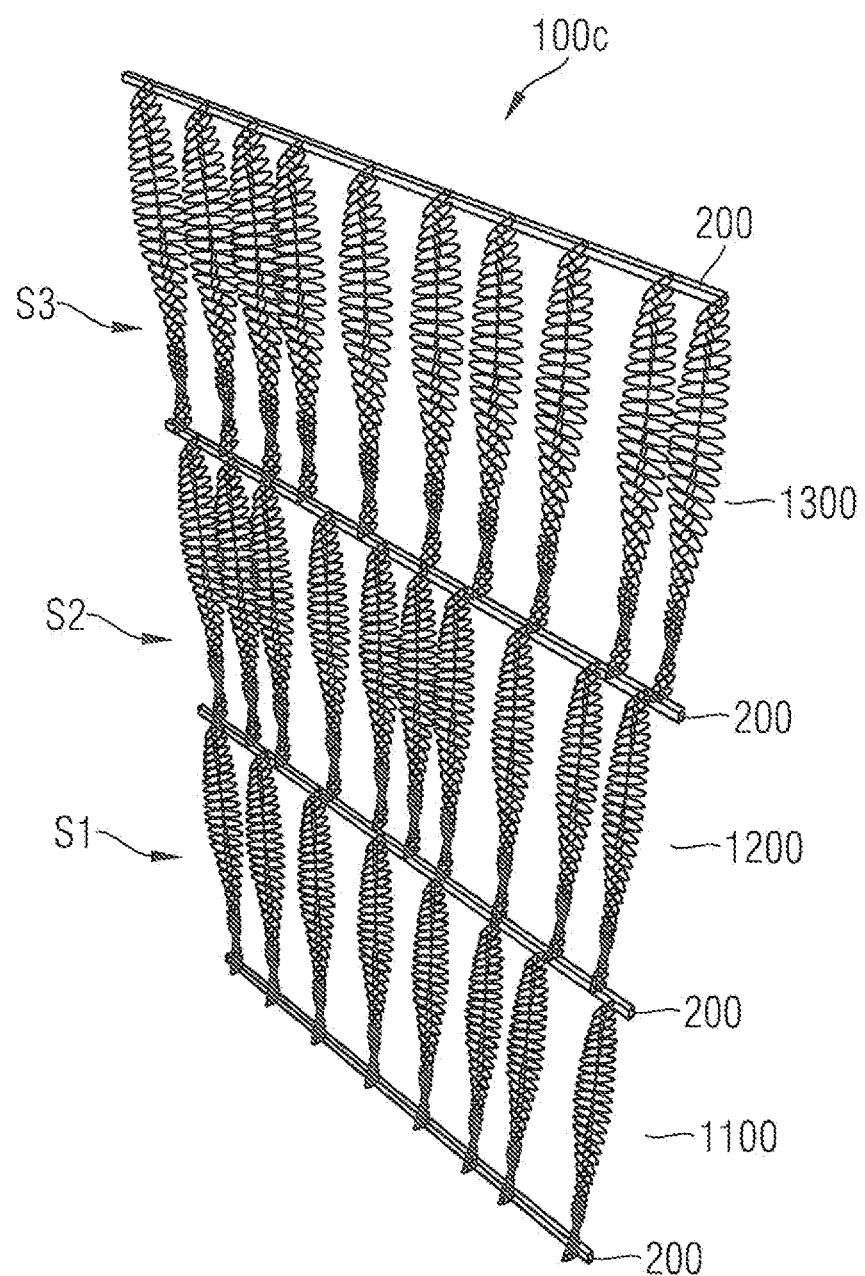
FIG. 6A is a view of a third embodiment of a cholesteric liquid-crystal layer arrangement having first molecule arrangements for a light-transmitting pane of a head-up display arrangement.
Figure 6B:
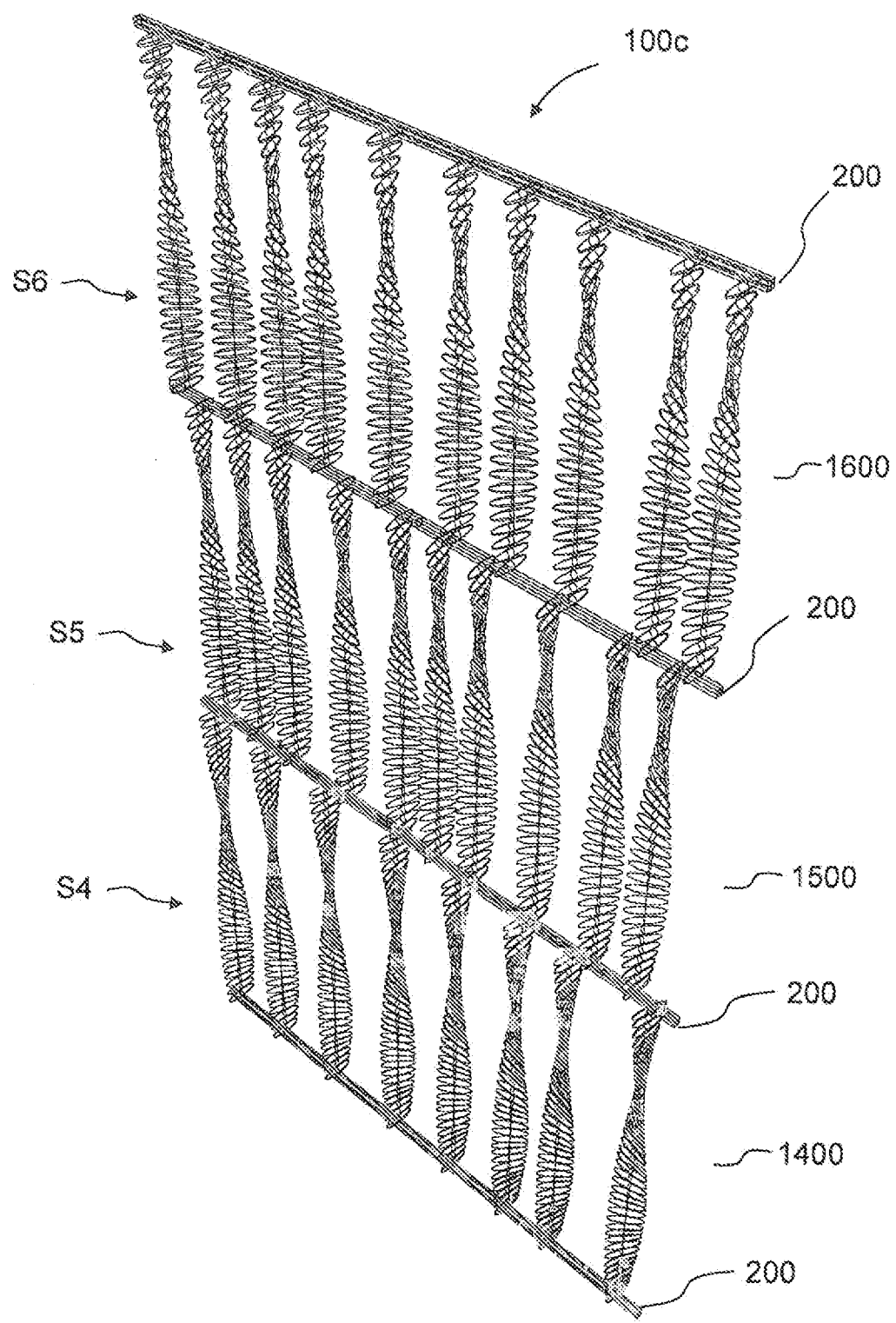
FIG. 6B is a view of the third embodiment of a cholesteric liquid-crystal layer arrangement having second molecule arrangements for a light-transmitting pane of a head-up display arrangement.

FIGS. 6A and 6B illustrate a further embodiment of a cholesteric liquid-crystal layer arrangement 100c for a light-transmitting pane of a head-up display arrangement. For a better representation, the helical molecule arrangements 1100, 1200 and 1300 as well as the helical molecule arrangements 1400, 1500 and 1600 are shown in two FIGS. 6A and 6B. However, this is a layer construction, in which the helical molecule arrangements 1400, 1500 and 1600 are arranged above the molecule arrangements 1100, 1200 and 1300. The overall cholesteric liquid-crystal layer arrangement 100c therefore has a total of 6 layers S1, . . . , S6, in which the helical molecule arrangements 1100, . . . , 1600 are arranged. The cholesteric liquid-crystal layer arrangement 100c can be applied to the surface 011 of the light-transmitting pane 11a illustrated in FIG. 2 or can be integrated in the light-transmitting pane 11b illustrated in FIG. 3.

The cholesteric liquid-crystal layer arrangement 100c has the helical molecule arrangements 1100, 1200 and 1300 described by means of FIG. 5, which are illustrated in FIG. 6A. The helical molecule arrangements 1100, 1200 and 1300 are arranged in the different layer planes S1, S2 and S3 arranged above one another on a substrate layer 200, for example, a polymer layer. In each layer plane, the helical molecule arrangements arranged therein have a uniform pitch and/or a uniform overall length. In the different layer planes S1, S2 and S3, the molecule arrangements 1100, 1200, 1300 have different pitches and/or different overall lengths.

For example, the helical molecule arrangements 1100 in the layer plane S1 have a pitch of 300 nm; the helical molecule arrangements 1200 in the layer plane S2 have a pitch of 370 nm; and the helical molecule arrangements 1300 in the layer plane S3 have a pitch of 460 nm. The helix length of the molecule arrangements 1100 may, for example, amount to 750 nm in the layer plane S1. The helix length of the molecule arrangements 1200 may, for example, amount to 925 nm in the layer plane S2; and the helix length of the molecule arrangements 1300 may, for example, amount to 1,150 nm in the layer plane S3.

In addition to the helical molecule arrangements 1100, 1200 and 1300, the cholesteric liquid-crystal layer arrangement 100c contains the further helical molecule layer arrangements 1400, 1500 and 1600, which are illustrated in FIG. 6B. These helical molecule arrangements 1400, 1500 and 1600 are also arranged in the different layer planes S4, S5 and S6 arranged above one another, each on a substrate layer 200, for example, a polymer layer. In each layer plane, the helical molecule arrangements arranged therein have a uniform pitch and/or a uniform overall length. In the different layer planes S1, S2 and S3, the molecule arrangements 1400, 1500, 1600 have different pitches and/or different overall lengths.

For example, the helical molecule arrangements 1400 in the layer plane S4 have a pitch of 300 nm; the helical molecule arrangements 1500 in the layer plane S5 have a pitch of 370 nm; and the helical molecule arrangements 1600 in the layer plane S6 have a pitch of 460 nm. The helix length of the molecule arrangements 1400 may, for example, amount to 750 nm in the layer plane S1. The helix length of the molecule arrangements 1500 may, for example, amount to 925 nm in the layer plane S5; and the helix length of the molecule arrangements 1600 may, for example, amount to 1,150 nm in the layer plane S6.

The cholesteric liquid-crystal layer arrangement 100c may have a double-refracting construction, with an ordinary index of refraction of approximately 1.5 and an extraordinary index of refraction of, for example, of 1.5 to 1.8. The helical molecule arrangements 1100, 1200 and 1300 have a different chirality than the helical molecule arrangements 1400, 1500 and 1600. For example, the helical molecule arrangements 1100, 1200, and 1300 are wound in a right-handed manner, while the helical molecule arrangements 1400, 1500 and 1600 are arranged in a left-handed fashion. This has the result that, when p-polarized light from the image generating device of the head-up display arrangement is incident on the cholesteric liquid-crystal molecule arrangements 1100, 1200 and 1300, for example, the right-circular polarization direction of p-polarized light is reflected, whereas, at the cholesteric liquid-crystal molecule arrangements 1400, 1500, 1600, the left-circular polarization direction of p-polarized light is reflected. The total reflectivity is therefore increased approximately by the factor two.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Vehicle
2 Polarized sunglasses
10 Head-up display arrangement
11 Light-transmitting pane
12 Image generating device
100 Cholesteric liquid-crystal layer arrangement
110 Molecule
200 Substrate
1100, . . . , 1600 Helical molecule arrangements
S1, . . . , S6 Layer planes

The invention claimed is:

1. A light-transmitting pane for a head-up display arrangement for displaying a full-color image that is visible through polarized sunglasses, the light-transmitting pane comprising:
a cholesteric liquid-crystal layer arrangement, which is arranged in an interior of the pane or is arranged on a surface of the pane so as to reflect linearly p-polarized incident light generated by an image generating device,
wherein the light-transmitting pane is configured to display the full-color image by reflecting the linearly p-polarized incident light from the cholesteric liquid-crystal layer arrangement such that circularly polarized reflected light is propagatable in the direction of a driver wearing the sunglasses if the cholesteric liquid-crystal layer arrangement is arranged on the surface of the pane and elliptically polarized reflected light is propagatable in the direction of the driver wearing the sunglasses if the cholesteric liquid-crystal layer arrangement is arranged in the interior of the pane,
wherein the cholesteric liquid-crystal layer arrangement comprises a plurality of helical molecule arrangements in different layer planes that are arranged above one another, wherein each of the plurality of helical molecule arrangements is arranged on a respective polymer layer, wherein each of the plurality of helical molecule arrangements has a same chirality, and wherein each of the different layer planes is defined between respective polymer layers,
wherein helical molecule arrangements in a first one of the different layer planes have a uniform pitch and a uniform overall length, and
wherein the plurality of helical molecule arrangements have a different pitch and a different overall length in each of the different layer planes.

2. The light-transmitting pane according to claim 1 further comprising an additional plurality of helical molecule arrangements in different layer planes that are arranged above one another, wherein the additional plurality of helical molecule arrangements are arranged above the plurality of helical molecule arrangements and wherein the additional plurality of helical molecule arrangements have a different chirality than the plurality of helical molecule arrangements.

3. A head-up display arrangement comprising:
a light-transmitting pane comprising a cholesteric liquid-crystal layer arrangement, which is arranged in an interior of the pane or is arranged on a surface of the pane so as to reflect linearly p-polarized incident light; and
an image generating device for generating a virtual image from linearly p-polarized light generated at an output side of the image generating device,
wherein the pane and the image generating device are arranged such that the linearly p-polarized light generated by the image generating device is incident on the cholesteric liquid-crystal layer arrangement, and a full-color image is displayed on the light-transmitting pane by virtue of the cholesteric liquid-crystal layer arrangement reflecting the incident linearly p-polarized light so that circularly polarized light is propagatable in the direction of a driver wearing sunglasses if the cholesteric liquid-crystal layer arrangement is arranged on the surface of the pane and elliptically polarized light is propagatable in the direction of the driver wearing sunglasses if the cholesteric liquid-crystal layer arrangement is arranged in the interior of the pane,
wherein the cholesteric liquid-crystal layer arrangement comprises a plurality of helical molecule arrangements in different layer planes that are arranged above one another, wherein each of the plurality of helical molecule arrangements is arranged on a respective polymer layer, wherein each of the plurality of helical molecule arrangements has a same chirality, and wherein each of the different layer planes is defined between respective polymer layers,
wherein helical molecule arrangements in a first one of the different layer planes have a uniform pitch and a uniform overall length, and
wherein the plurality of helical molecule arrangements have a different pitch and a different overall length in each of the different layer planes.

4. A head-up display arrangement according to claim 3, wherein the image generating device is configured to generate circularly polarized light.

5. The head-up display arrangement according to claim 3, wherein the image generating device is configured to generate light that is polarized exclusively parallel to a plane of incidence of the pane.

6. The head-up display arrangement according to claim 3, wherein the cholesteric liquid-crystal layer arrangement is configured to transmit at least 70% of non-polarized light impinging on the cholesteric liquid-crystal layer arrangement.

7. The head-up display arrangement according to claim 3 further comprising an additional plurality of helical molecule arrangements in different layer planes that are arranged above one another, wherein the additional plurality of helical molecule arrangements are arranged above the plurality of helical molecule arrangements and wherein the additional plurality of helical molecule arrangements have a different chirality than the plurality of helical molecule arrangements.

8. A head-up display arrangement comprising:
   a light-transmitting pane comprising a cholesteric liquid-crystal layer arrangement, which is arranged in an interior of the pane so as to reflect linearly p-polarized incident light; and
   an image generating device for generating a virtual image from linearly p-polarized light generated at an output side of the image generating device,
   wherein the pane and the image generating device are arranged such that the linearly p-polarized light generated by the image generating device is incident on the cholesteric liquid-crystal layer arrangement, and a full-color image is displayed on the light-transmitting pane by virtue of the cholesteric liquid-crystal layer arrangement reflecting the incident linearly p-polarized light so that elliptically polarized light is propagatable in the direction of the driver wearing sunglasses,
   wherein the cholesteric liquid-crystal layer arrangement comprises a plurality of helical molecule arrangements in different layer planes that are arranged above one another, wherein each of the plurality of helical molecule arrangements is arranged on a respective polymer layer, wherein each of the plurality of helical molecule arrangements has a same chirality, and wherein each of the different layer planes is defined between respective polymer layers,
   wherein helical molecule arrangements in a first one of the different layer planes have a uniform pitch and a uniform overall length, and
   wherein the plurality of helical molecule arrangements have a different pitch and a different overall length in each of the different layer planes.

9. The head-up display arrangement according to claim 8 further comprising an additional plurality of helical molecule arrangements in different layer planes that are arranged above one another, wherein the additional plurality of helical molecule arrangements are arranged above the plurality of helical molecule arrangements and wherein the additional plurality of helical molecule arrangements have a different chirality than the plurality of helical molecule arrangements.

* * * * *